(12) United States Patent
Disam et al.

(10) Patent No.: US 12,715,386 B2
(45) Date of Patent: Aug. 25, 2026

(54) CURTAIN-TYPE SIDE AIRBAG AND CURTAIN-TYPE AIRBAG MODULE

(71) Applicants: ZF AUTOMOTIVE GERMANY GMBH, Alfdorf (DE); Audi AG, Ingolstadt (DE)

(72) Inventors: Robert Disam, Mutlangen (DE); Michael Kaiser, Urbach (DE); Michael Stegmeier, Schwäbisch Gmünd (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 0 days.

(21) Appl. No.: 18/862,287

(22) PCT Filed: Apr. 28, 2023

(86) PCT No.: PCT/EP2023/061293
§ 371 (c)(1),
(2) Date: Nov. 1, 2024

(87) PCT Pub. No.: WO2023/213718
PCT Pub. Date: Nov. 9, 2023

(65) Prior Publication Data

US 2025/0289390 A1 Sep. 18, 2025

(30) Foreign Application Priority Data

May 3, 2022 (DE) ..................... 10 2022 110 869.4

(51) Int. Cl.
*B60R 21/232* (2011.01)
*B60R 21/00* (2006.01)
(Continued)

(52) U.S. Cl.
CPC .......... *B60R 21/232* (2013.01); *B60R 21/213* (2013.01); *B60R 2021/0009* (2013.01);
(Continued)

(58) Field of Classification Search
CPC .... B60R 2021/0009; B60R 2021/0023; B60R 2021/0048; B60R 2021/23386; B60R 2021/23388; B60R 21/213; B60R 21/232
See application file for complete search history.

(56) References Cited

U.S. PATENT DOCUMENTS 5,957,487 A * 9/1999 Stutz ................ B60R 21/23184 280/730.2
7,735,863 B2 * 6/2010 Walston ................. B60R 21/08 280/730.2
(Continued)

FOREIGN PATENT DOCUMENTS

DE 19852231 A1 5/2000
EP 0798168 B1 10/2000
(Continued)

OTHER PUBLICATIONS

Machine translation of JP2009292182A, JP, Goto et al., published Dec. 17, 2009, translation obtained Jul. 11, 2025. (Year: 2025).*
(Continued)

*Primary Examiner* — Laura Freedman
(74) *Attorney, Agent, or Firm* — Tarolli, Sundheim, Covell & Tummino LLP

(57) ABSTRACT

A curtain side airbag (10), in particular for protection of a head area of a vehicle occupant (40), for a vehicle occupant restraint system (100), includes a main cushion (12) formed by one or more chambers which, when deployed and filled, extends along a longitudinal direction of the vehicle (x) between the vehicle occupant (40) and a side structure of a vehicle (54). The airbag includes an inner fabric layer (14) facing the vehicle occupant (40) as well as an outer fabric layer (16) facing the side structure of the vehicle. On the inner fabric layer (14), an additional friction-reducing impact layer (18) is arranged which covers at least part of the inner fabric layer (14) and is connected to the inner fabric
(Continued)

layer (14) in such a way that the friction-reducing impact layer (18) is movable relative to the inner fabric layer (14) at least in the longitudinal direction of the vehicle (x).

15 Claims, 2 Drawing Sheets

(51) Int. Cl.
*B60R 21/213* (2011.01)
*B60R 21/2338* (2011.01)

(52) U.S. Cl.
CPC ................. *B60R 2021/0023* (2013.01); *B60R 2021/0048* (2013.01); *B60R 2021/23386* (2013.01); *B60R 2021/23388* (2013.01)

(56) References Cited

U.S. PATENT DOCUMENTS 8,353,530 B2 * 1/2013 Czach .................. B60R 21/232 280/730.2
8,414,019 B2 * 4/2013 Naganawa ........... B60R 21/231 280/731
8,740,247 B1 * 6/2014 Jovicevic ............. B60R 21/213 280/730.2
8,789,846 B2 * 7/2014 Wipasuramonton ......................... B60R 21/2338 280/730.2
9,421,940 B2 * 8/2016 Lee ...................... B60R 21/231
11,155,231 B2 * 10/2021 Ohno .................... B60R 21/232
11,780,395 B2 * 10/2023 Morita .................. B60R 21/201 280/731
12,043,199 B2 * 7/2024 Santín ............... B60R 21/23138
2018/0099634 A1 4/2018 Ohno et al.

FOREIGN PATENT DOCUMENTS

JP HO5213132 A 8/1993
JP 2003170795 A * 6/2003
JP 2009292182 A 12/2009
JP 5824584 B2 11/2015
JP 2016055824 A 4/2016

OTHER PUBLICATIONS

Machine translation of JP2016055824, JP, Ono, published Apr. 21, 2016, translation obtained Jul. 11, 2025. (Year: 2025).*
Machine translation of WO 2014061323 A1, WO, Takeuchi et al., published Apr. 24, 2014, translation obtained Dec. 1, 2025 (Year: 2025).*
International Search Report for corresponding International application No. PCT/EP2023/061293, with a mailing date of Aug. 24, 2023, 20 pages.

* cited by examiner

A-A
20
14
18
20
22
16
22
x 10
14
18
24
36
20
24
20
36
20
A
A
36
20
24
24
24
74
36
12
22
36

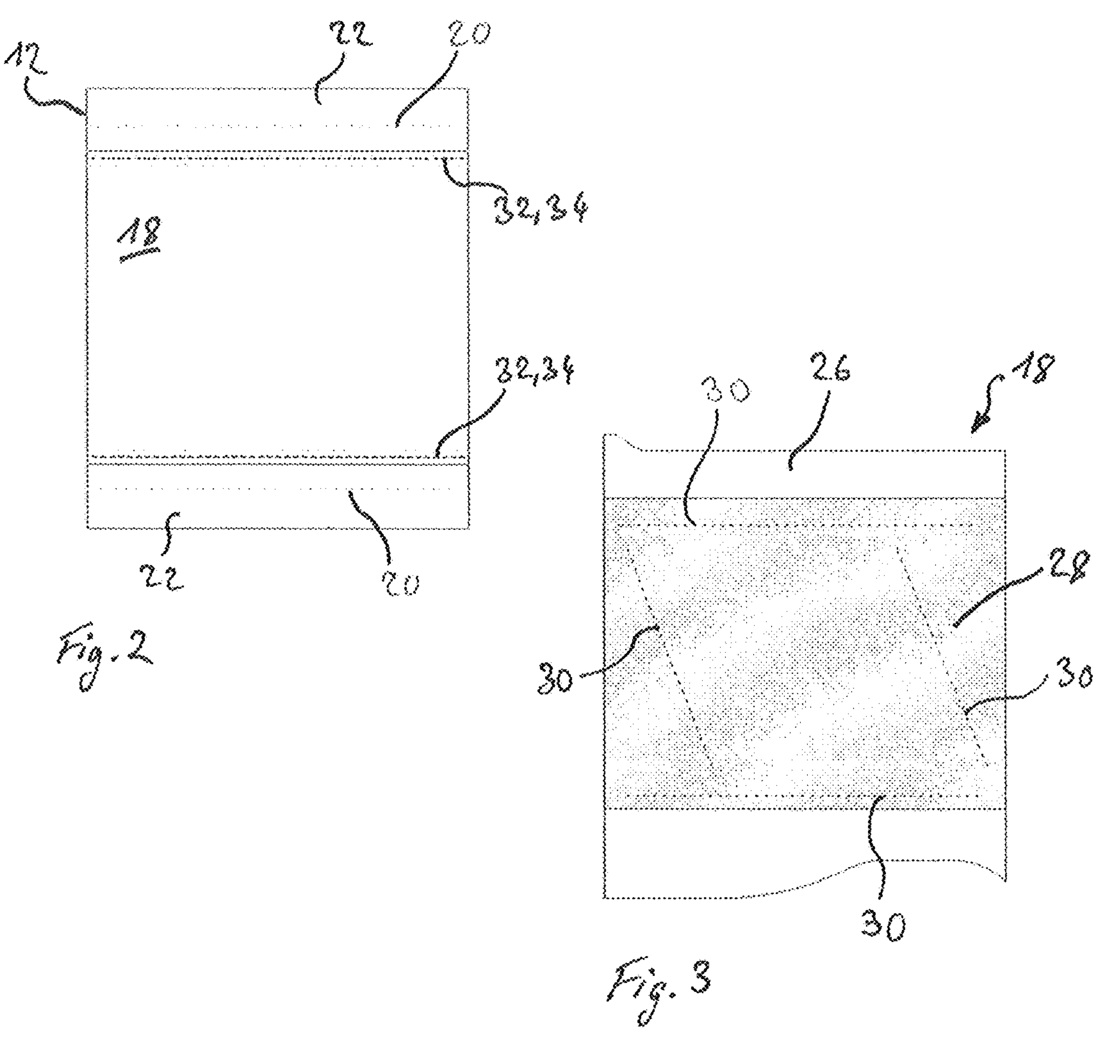
Fig. 2
Fig. 3
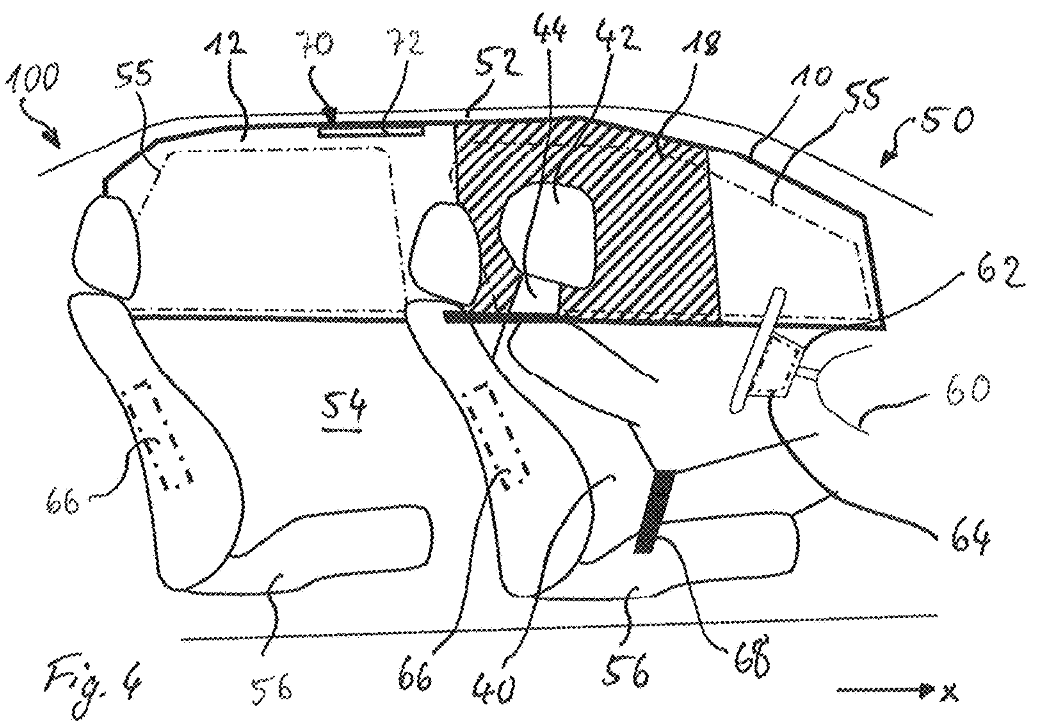
Fig. 4

CURTAIN-TYPE SIDE AIRBAG AND CURTAIN-TYPE AIRBAG MODULE

RELATED APPLICATIONS

This application is a U.S. National Stage Application filed under 35 USC 371, claiming priority to Serial No. PCT/EP2023/061293, filed on 28 Apr. 2023; which claims priority from DE Patent Application 10 2022 110 869.4, filed 3 May 2022, the entireties of which are hereby incorporated herein by reference.

TECHNICAL FIELD

The invention relates to a curtain side airbag according to the preamble of claim 1 and to a curtain airbag module according to the preamble of claim 10.

BACKGROUND

Curtain side airbags (also referred to as curtain airbag) for the protection of vehicle occupants are widespread in current motor vehicles. Curtain side airbags are used in particular for the protection of the head and of the vehicle occupant in the event of side impacts. Also, in the event of angled impacts or a laterally offset frontal impact, the curtain side airbags are used for the protection of the vehicle occupant.

EP 0 798 168 B1 illustrates a curtain side airbag of this type which, when inflated and deployed, extends from an area laterally from a front-seat occupant to an area laterally from a rear-seat occupant between the vehicle occupant and the side structure of the vehicle.

SUMMARY

It is the object of the invention to provide a curtain side airbag which offers improved protection of the vehicle occupant during an angled impact or a laterally offset frontal impact.

The features according to the claims 1 and 10 lead to achieving the object. Advantageous configurations are described in the subclaims.

The object is achieved by a curtain side airbag for a vehicle occupant restraint system that is provided specifically for the protection of the head area of a vehicle occupant, the head area comprising at least the head and the neck of the vehicle occupant. The curtain side airbag according to the invention comprises a main cushion formed by one or more chambers which, when deployed and filled, extends along a longitudinal direction of the vehicle between the vehicle occupant and a side structure of a vehicle. The main cushion of the curtain side airbag is formed by an inner fabric layer facing the vehicle occupant and an outer fabric layer facing the side structure of the vehicle. The main cushion of the curtain side airbag comprises an additional friction-reducing impact layer which is arranged on the inner fabric layer and covers at least a part of the inner fabric layer. The friction-reducing impact layer covers at least a part of the inner fabric layer and is connected to the inner fabric layer so that the friction-reducing impact layer is movable relative to the inner fabric layer at least in the longitudinal direction of the vehicle.

The additional friction-reducing impact layer can help achieve, in particular in the event of an angled impact or a laterally offset frontal impact, that the friction between the vehicle occupant and the curtain side airbag is reduced. Due to the reduction of friction, the vehicle occupant can "slide along" the side of the curtain side airbag facing the vehicle interior in the event of an angled impact or a laterally offset frontal impact, while the further systems of the vehicle occupant restraint system, such as e.g. the seatbelt system or the front airbags, can develop the complete protective effect, thus allowing the moments and accelerations acting upon the head, the throat and/or the neck of the vehicle occupant to be reduced.

Preferably, for this purpose the impact layer is movable in the longitudinal direction of the vehicle relative to the inner fabric layer by at least 10 cm, specifically by at least 15 cm, in particular without the impact layer being destroyed in the contact area with the head of the vehicle occupant and/or without the main cushion being deformed.

The main cushion of the curtain side airbag can be designed both as a one-piece-woven airbag (OPW) or as a cut-and-sew airbag. For the OPW airbag, the superimposed fabric layers are woven simultaneously and, in doing so, the fabric layers are woven together so that they form connections such as darts inside the main cushion and/or the edge seam surrounding the main cushion by which the inflatable volume of the OPW airbag is defined. For the cut-and-sew airbag, the inner and outer fabric layers are formed separately and a sewn together by the edge seam and darts for forming the main cushion.

In preferred embodiments, the impact layer is sewn or glued to the main cushion.

The impact layer is arranged on the inner fabric layer such that, when deployed and filled, it is directed to the vehicle occupant.

In embodiments in which the impact layer is sewn to the main cushion, the attachment is carried out by the seams preferably in the area of the edge seam of the main cushion and/or in the area of darts inside the main cushion. Thus, the attachment by at least one seam is preferably arranged inside a non-inflatable area of the main cushion. This allows to prevent in particular a tightness of the fillable area of the curtain side airbag from being impaired by the seam.

In an embodiment in which the impact layer is glued to the main cushion, the impact layer is attached onto the inner fabric layer. Accordingly, the impact layer can be attached at will to the surface of the inner fabric layer of the main cushion of the curtain side airbag.

Alternatively, the impact layer can be attached to the main cushion also via further method of attachment such as by ultrasonic welding.

The friction-reducing impact layer is preferably made of a highly flexible material that enables the impact layer to be displaced with little friction relative to the inner fabric layer of the main cushion of the curtain side airbag. In particular, the impact layer can be designed so that it is not destroyed when being displaced by the head of the vehicle occupant, and it can be ensured in this way that during the whole restraining operation friction-reducing material of the impact layer is located between the head of the vehicle occupant and the curtain side airbag.

Such a highly flexible friction-reducing impact layer can be designed as a knitted fabric, for example. A knitted fabric is a textile that is manufactured by forming a mesh structure. Preferably, the knitted fabric of the impact layer can be manufactured of a polyamide such as PA 6.6 or PA 6, for example of nylon threads.

As an alternative, the friction-reducing impact layer can be designed as a non-woven fabric. The non-woven fabric can be a spunbonded fabric having a grammage of at least 15 g/m$^2$, preferably of at least 30 g/m$^2$.

In another embodiment, the friction-reducing impact layer can be a multi-layer design and can comprise at least one base layer in the form of a flat woven fabric and a friction layer in the form of a non-woven fabric. The friction layer is attached to the base layer, such as by sewing or gluing. Preferably, such a multi-layer impact layer is designed as a preassembly group that is subsequently attached to the main cushion of the curtain side airbag. Such a multi-layer embodiment of the impact layer offers the advantage that the attachment of the friction layer to the base layer can be carried out independently of the later attachment of the impact layer to the main cushion within the non-inflatable areas of the main cushion.

In a further embodiment, the impact layer can include one or more weakened zones. The weakened zone can be formed, for example, by a perforation introduced into the impact layer. Preferably, the weakened zone can be arranged close to the attachment of the impact layer to the main cushion in the area of the edge seam. This allows to achieve a targeted breaking of the impact layer in the area of the weakened zone and, thus, to prevent the impact layer from breaking in the area of the head contact points.

The object is further achieved by a curtain airbag module for a vehicle occupant restraint system for installation in a vehicle in the area of a roof edge comprising a curtain side airbag according to any one of the above-described embodiments. The curtain airbag module is arranged in the vehicle in such a way that the curtain side airbag, when deployed and filled, covers at least the area between a vehicle occupant and a side structure of the vehicle and a friction-reducing impact layer is arranged on the inner fabric layer in such a way that, in a situation of restraint triggered by an angled impact, the friction between a head of a vehicle occupant and the curtain side airbag is reduced.

BRIEF DESCRIPTION OF THE DRAWINGS

Description of Figures

Figure 1:
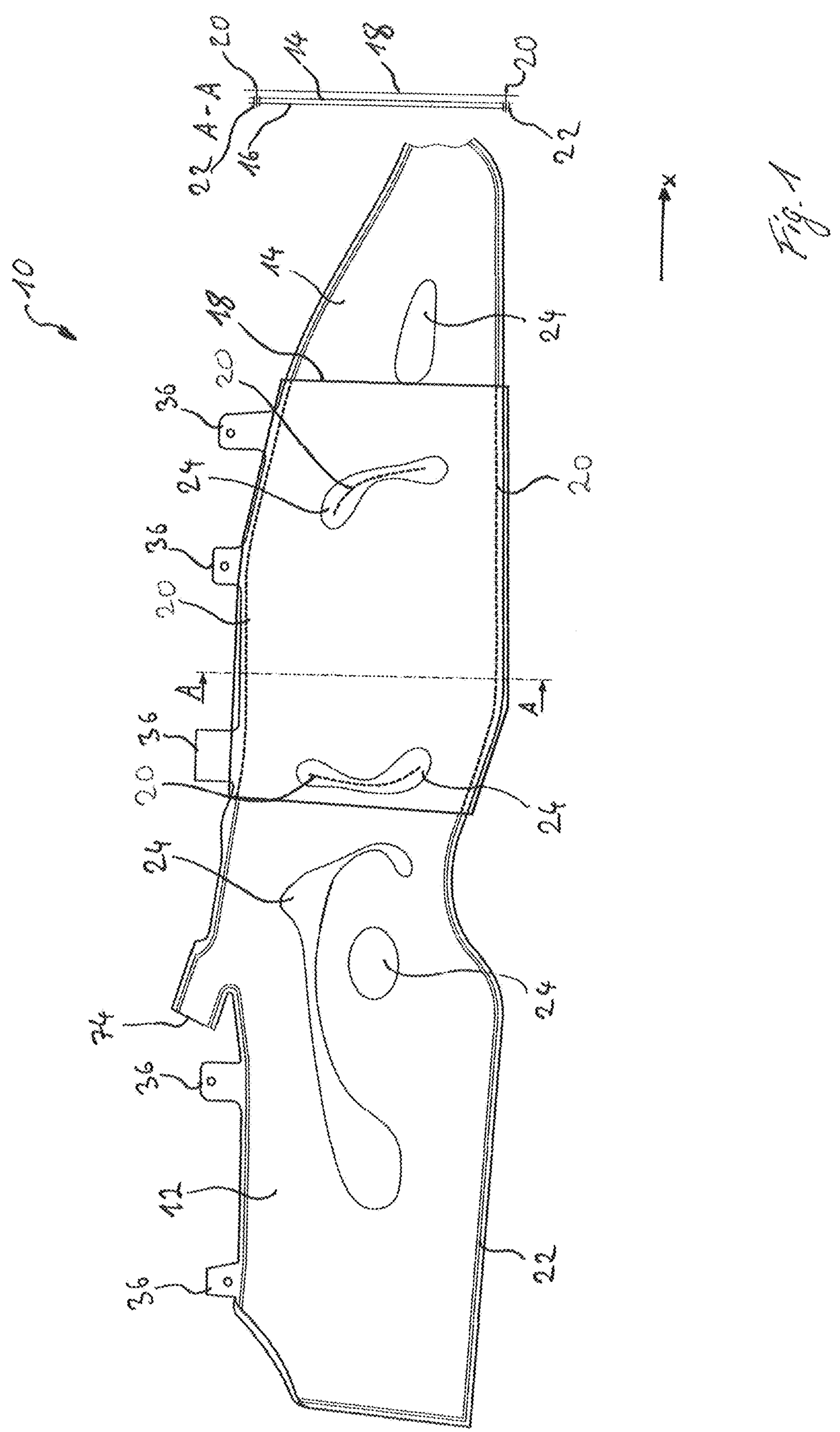

Further advantages, features and details of the invention will be evident from the following description of an embodiment that is not meant to be limiting and on the basis of the drawings, wherein:

FIG. 1 shows a first embodiment of a curtain side airbag according to the invention;

FIG. 2 shows a cutout from a second embodiment of the curtain side airbag according to the invention;

FIG. 3 shows another embodiment of an impact layer for a curtain side airbag according to the invention; and FIG. 4 shows a schematic view of a vehicle comprising a curtain side airbag according to the invention.

DESCRIPTION

FIG. 1 illustrates a first embodiment of a curtain side airbag 10 according to the invention for a vehicle occupant restraint system 100 (see FIG. 4) that is provided for the protection of a head area of a vehicle occupant 40.

The curtain side airbag 10 is formed by a main cushion 12 which, in the shown embodiment, is in the form of an OPW airbag that is woven in one piece in a multi-layer weaving process. In doing so, the inner fabric layer 14 and the outer fabric layer 16 are woven together at least in the area of the edge seam 22 so that connections are formed between the inner fabric layer 14 and the outer fabric layer 16 which are not inflatable and delimit the inflatable volume of the main cushion 12. In addition, in the multi-layer weaving process darts 24 can be introduced in the area of which the inner fabric layer 14 and the outer fabric layer 16 are also woven together so that the darts 24 also constitute a non-inflatable area. As a matter of course, the curtain side airbag 10 can also include darts (not shown) in the area of which the inner fabric layer 14 and the outer fabric layer 16 are connected to each other so that the main cushion is inflatable at least to a limited extent and warp and weft threads changing the fabric layer form spacers so that only the thickness of the main cushion 12 is limited.

For attachment in a vehicle 50 (see FIG. 4), the curtain side airbag 10 comprises plural attaching tabs 36. Further, in FIG. 1 the inflation mouth including the inflator mount 74 for the inflator 72 of the curtain airbag module 70 is shown.

An additional friction-reducing impact layer 18 (see sectional view A-A in FIG. 1) which covers part of the inner fabric layer 14 is arranged on the inner fabric layer 14 of the main cushion 12.

The impact layer 18 is attached, in the embodiment of FIG. 1, to the main cushion via the seams 20 in the area of the edge seam 22 and two of the darts 24. An arrangement of the seams 20 for attaching the impact layer 18 in the non-inflatable areas 22, 24 offers the advantage that the characteristics of the curtain side airbag 12 such as e.g. the tightness are not impaired in this way.

As an alternative, the impact layer 18 can be attached to the inner fabric layer 14 by gluing or by welding.

The impact layer 18 can be attached to the inner fabric layer 14 also outside the non-inflatable areas 22, 24, of course, in particular when the impact layer 18 is attached to the inner fabric layer 14 by gluing.

Preferably, the impact layer 18 is a textile that allows the impact layer 18 to be movable relative to the inner fabric layer 14 at least in the longitudinal direction of the vehicle x in the event of an angled impact or a laterally offset frontal impact. For example, the impact layer 18 can also be designed as a highly flexible textile for this purpose.

It is achieved in this way that the impact layer is not destroyed at least in the head contact area when it contacts the head 42 and/or neck 44 of the vehicle occupant 40 (hereinafter referred to as head contact area) in the event of an angled impact or a laterally offset frontal impact, but can expand until the further restraint systems of the vehicle occupant restraint system 100 can develop the full protective effect.

The further restraint systems can be, for example, a seatbelt system 68 or a front airbag module 62 arranged in the instrument panel 60 or in the steering wheel 62 and including a front airbag. Moreover, the vehicle occupant restraint system 100 can comprise further restraint systems such as seat-integrated side airbag modules 66, for example.

The textile of the impact layer 18 can be a textile in the form of a knitted fabric or a tubular fabric or of a non-woven fabric such as a spunbonded fabric.

The impact layer 18 can be manufactured of a polyamide, specifically of PA 6.6 or PA 6.

FIG. 2 illustrates a cutout from the main cushion 12 of a second embodiment of the curtain side airbag 10. In this embodiment, the impact layer 18 is a non-woven fabric and is also attached to the main cushion 12 in the area of the edge seam 22 via a seam 20. In contrast to the embodiment of FIG. 1, the impact layer 18 in this case includes a respective weakened zone 32 that is close to the attachment formed by the seam 20.

The weakened zone 32 in the shown embodiment is in the form of a perforation 34 introduced into the impact layer 18. The arrangement of the weakened zone 32 close to the attachment formed by the seam 20 can help achieve a targeted breaking of the impact layer 18 in the area of the weakened zone 32 when the head 42 of the vehicle occupant 40 hits the latter and, thus, helps prevent the impact layer 18 from breaking in the head contact area. As a matter of course, also an impact layer 18 in the form of a knitted fabric or another textile may include those weakened zones.

FIG. 3 illustrates another embodiment of an impact layer 18 for the curtain side airbag 10. In contrast to the single-layer impact layers of the preceding Figures, the impact layer 18 shown in FIG. 3 has a multi-layer design and consists of a base layer 26 and a friction layer 28. The base layer 26 is designed as an uncoated flat woven fabric, for example, and the friction layer 28 is designed as a highly flexible textile. The friction layer 28 in the embodiment of FIG. 3 is attached to the base layer via seams 30. Preferably, such an impact layer 18 is attached to the main cushion 12 of the curtain side airbag 10 as a prefabricated preassembly group.

A multi-layer embodiment of the impact layer 18 offers the advantage that the friction layer 28 can be attached to the base layer 26 independently of the arrangement of the non-inflatable areas 22 and 24 in the main cushion 12 and the later attachment of the impact layer 18 to the main cushion 12 within the non-inflatable areas 22 and 24 of the main cushion 12.

FIG. 4 schematically illustrates a vehicle 50 comprising a vehicle occupant restraint system 100 that comprises a curtain airbag module 70 with a curtain side airbag 10 which is installed in the vehicle in the area of a roof edge 52.

As can be seen from FIG. 4, the curtain side airbag 10 is arranged, when deployed and filled, between a vehicle occupant 40 and a side structure 54 of the vehicle 50 and covers at least the area between the head 42 and the neck 44 of the vehicle occupant 40 and the side windows 55.

The impact layer 18 is arranged on the inner fabric layer 14 facing the vehicle occupant 40 so that, in the event of a situation of restraint triggered by an angled impact or a laterally offset frontal impact, the friction between a head 42 of the vehicle occupant 40 and the curtain side airbag 10 is reduced so that, when the impact layer contacts the head 42 and/or the neck 44, the impact layer is not destroyed in the head contact area but can expand until the further restraint systems of the vehicle occupant restraint system 100 can develop the full protective effect.

The invention claimed is:

1. A curtain side airbag for a vehicle occupant restraint system, comprising a main cushion formed by one or more chambers which, when deployed and filled is configured to extend along a longitudinal direction of a vehicle between a vehicle occupant and a side structure of the vehicle and includes an inner fabric layer facing the vehicle occupant as well as an outer fabric layer facing the side structure of the vehicle, wherein on the inner fabric layer, an additional friction-reducing impact layer is arranged which covers at least part of the inner fabric layer and is connected to the inner fabric layer at a plurality of spaced locations, wherein the friction-reducing impact layer is configured to be more flexible than the inner fabric layer such that portions of the friction-reducing impact layer between the spaced locations are movable relative to the inner fabric layer to the extent that the friction-reducing in response to the vehicle occupant impacting the impact layer, at least in the longitudinal direction of the vehicle, without being destroyed.

2. The curtain side airbag according to claim 1, wherein, at the spaced locations, the impact layer is sewn or glued to the main cushion.

3. The curtain side airbag according to claim 2, wherein, at the spaced locations, the impact layer is sewn to the main cushion in non-inflatable areas.

4. The curtain side airbag according to claim 3, wherein the impact layer is sewn to the main cushion in an area of an edge seam and/or a dart.

5. The curtain side airbag according to claim 1, wherein the impact layer is in the form of a non-woven fabric.

6. The curtain side airbag according to claim 5, wherein the impact layer is a multi-layer design and comprises at least one base layer in the form of a flat-woven fabric and one friction layer in the form of a non-woven fabric, the friction layer being attached to the base layer.

7. The curtain side airbag according to claim 1, wherein the impact layer is in the form of a knitted fabric.

8. The curtain side airbag according to claim 1, wherein the impact layer is manufactured of polyamide 6.6 or polyamide-6.

9. The curtain side airbag according to claim 1, wherein the impact layer has a weakened zone.

10. The curtain side airbag according to claim 9, wherein the weakened zone is formed by a perforation introduced into the impact layer.

11. The curtain side airbag according to claim 10, wherein the perforation is positioned close to an edge seam of the curtain side airbag.

12. The curtain side airbag according to claim 10, wherein the perforation is configured to produce a targeted breaking of the impact layer that prevents breaking in an area of head contact points on the impact layer.

13. A curtain airbag module for a vehicle occupant restraint system for installation in a vehicle in an area of a roof edge, comprising a curtain side airbag according to claim 1, wherein the curtain side airbag, when deployed and filled, is configured to cover at least an area between the vehicle occupant and the side structure of the vehicle and the friction-reducing impact layer is arranged on the inner fabric layer of the curtain side airbag so that, in a situation of restraint triggered by an angled impact, friction between a head of the vehicle occupant and the curtain side airbag is reduced.

14. The curtain side airbag according to claim 1, wherein the impact layer is configured to move at least 10 cm relative to the inner fabric layer without being destroyed.

15. The curtain side airbag according to claim 1, wherein the impact layer is in the form of a mesh structure.

* * * * *